United States Patent
Andreasen et al.

(10) Patent No.: US 9,470,292 B2
(45) Date of Patent: Oct. 18, 2016

(54) DUAL CLUTCH TYPE POWER TRANSMISSION WITH ALTERNATIVE TORQUE TRANSMISSION PATH PROVIDING ALTERNATIVE RATIOS

(71) Applicant: PACIFIC RIM ENGINEERED PRODUCTS (1987) LTD., Surrey (CA)

(72) Inventors: Kenneth Hartmann Andreasen, Delta (CA); Jonathan David Deagle, Vancouver (CA); Bradley Edward Williams, Ladner (CA)

(73) Assignee: Pacific Rim Engineered Products (1987) Ltd., Surrey (CA)

( * ) Notice: Subject to any disclaimer, the term of this patent is extended or adjusted under 35 U.S.C. 154(b) by 0 days.

(21) Appl. No.: 14/387,527

(22) PCT Filed: Mar. 22, 2013

(86) PCT No.: PCT/CA2013/050236
§ 371 (c)(1),
(2) Date: Sep. 23, 2014

(87) PCT Pub. No.: WO2013/138941
PCT Pub. Date: Sep. 26, 2013

(65) Prior Publication Data
US 2015/0040706 A1    Feb. 12, 2015

Related U.S. Application Data

(60) Provisional application No. 61/614,999, filed on Mar. 23, 2012.

(51) Int. Cl.
*F16H 3/08* (2006.01)
*F16H 3/00* (2006.01)
*F16H 3/16* (2006.01)

(52) U.S. Cl.
CPC ............. *F16H 3/006* (2013.01); *F16H 3/16* (2013.01); *F16H 2003/008* (2013.01); *Y10T 74/19242* (2015.01)

(58) Field of Classification Search
CPC .......... F16H 3/006; F16H 2003/0931; F16H 3/091; F16H 47/02
USPC .................. 74/330, 331, 333, 340
See application file for complete search history.

(56) References Cited

U.S. PATENT DOCUMENTS

| | | | |
|---|---|---|---|
| 2,943,502 A | 7/1960 | Perkins et al. | |
| 3,046,807 A | 7/1962 | Barth et al. | |

(Continued)

FOREIGN PATENT DOCUMENTS

| | | |
|---|---|---|
| CN | 101173711 A | 5/2008 |
| DE | 3427226 A1 | 1/1986 |
| WO | 2011051636 A1 | 5/2011 |

*Primary Examiner* — Ha D Ho
(74) *Attorney, Agent, or Firm* — Oyen Wiggs Green & Mutala LLP

(57) ABSTRACT

A dual clutch type transmission has first and second sections which respectively include first and second clutches. The clutches may be operated to allow torque transfer from an input to an output by way of the first section or the second section. One or more additional gear ratios is provided by a torque transfer pathway connecting the first and second sections such that torque is delivered from the input to the output by way of one or more stages of the first section and one or more stages of the second section. The additional gear ratios may comprise extra low gear ratios. Some embodiments provide transmissions suitable for driving pumps for use in hydraulic fracturing of geological formations.

18 Claims, 6 Drawing Sheets

(56) References Cited

U.S. PATENT DOCUMENTS

| | | | |
|---|---|---|---|
| 4,513,631 A | 4/1985 | Koivunen | |
| 4,592,249 A | 6/1986 | Lehmann et al. | |
| 5,119,695 A | 6/1992 | Milunas et al. | |
| 5,172,602 A | 12/1992 | Jurgens et al. | |
| 5,224,578 A | 7/1993 | Rheinheimer et al. | |
| 5,407,042 A | 4/1995 | Fukui et al. | |
| 5,407,401 A | 4/1995 | Bullmer et al. | |
| 5,662,198 A | 9/1997 | Kojima et al. | |
| 5,720,203 A | 2/1998 | Honda et al. | |
| 5,823,051 A * | 10/1998 | Hall, III | F16H 3/006 475/207 |
| 5,966,989 A | 10/1999 | Reed, Jr. et al. | |
| 5,997,433 A | 12/1999 | Domian et al. | |
| 6,098,771 A | 8/2000 | Vu | |
| 6,145,644 A | 11/2000 | Mohan et al. | |
| 6,276,224 B1 | 8/2001 | Ueda et al. | |
| 6,319,172 B1 | 11/2001 | Steinmetz et al. | |
| 6,427,550 B1 | 8/2002 | Bowen | |
| 6,463,821 B1 | 10/2002 | Reed, Jr. et al. | |
| 6,490,944 B1 | 12/2002 | Heinzel et al. | |
| 6,554,742 B2 | 4/2003 | Milender et al. | |
| 6,568,515 B2 | 5/2003 | Harries | |
| 6,588,292 B2 | 7/2003 | Yamasaki et al. | |
| 6,634,247 B2 | 10/2003 | Pels et al. | |
| 6,638,197 B2 | 10/2003 | Ogawa et al. | |
| 6,679,134 B2 | 1/2004 | Shigyo | |
| 6,715,597 B1 | 4/2004 | Buchanan et al. | |
| 6,729,456 B2 | 5/2004 | Beneton et al. | |
| 6,832,978 B2 | 12/2004 | Buchanan et al. | |
| 6,883,394 B2 | 4/2005 | Koenig et al. | |
| 6,889,811 B2 | 5/2005 | Ebert et al. | |
| 6,949,051 B2 | 9/2005 | Katakura | |
| 6,953,417 B2 | 10/2005 | Koenig | |
| 7,007,656 B2 | 3/2006 | Fujino | |
| 7,010,406 B2 | 3/2006 | Sah et al. | |
| 7,021,445 B2 | 4/2006 | Brissenden et al. | |
| 7,025,707 B2 | 4/2006 | Katakura | |
| 7,044,280 B2 | 5/2006 | Budal et al. | |
| 7,056,264 B2 | 6/2006 | Kupper et al. | |
| 7,066,862 B2 | 6/2006 | Bothe et al. | |
| 7,070,534 B2 * | 7/2006 | Pelouch | F16H 37/046 475/207 |
| 7,073,407 B2 | 7/2006 | Stefina | |
| 7,080,569 B2 | 7/2006 | Preisner et al. | |
| 7,080,722 B2 | 7/2006 | Vogt et al. | |
| 7,082,850 B2 | 8/2006 | Hughes | |
| 7,086,989 B2 | 8/2006 | Siebigteroth et al. | |
| 7,121,976 B2 | 10/2006 | Sakamoto et al. | |
| 7,137,495 B2 | 11/2006 | Berger et al. | |
| 7,163,096 B2 | 1/2007 | Neuner | |
| 7,171,867 B2 | 2/2007 | McCrary et al. | |
| 7,243,565 B2 | 7/2007 | Soeda | |
| 7,252,621 B2 | 8/2007 | Tanba et al. | |
| 7,300,375 B2 | 11/2007 | Petrzik | |
| 7,314,427 B2 | 1/2008 | Sakai et al. | |
| 7,326,149 B2 | 2/2008 | Kraska et al. | |
| 7,329,205 B2 | 2/2008 | Preisner et al. | |
| 7,337,050 B2 | 2/2008 | Preisner | |
| 7,338,408 B2 | 3/2008 | Petrzik et al. | |
| 7,381,151 B2 | 6/2008 | Shim | |
| 7,387,590 B2 | 6/2008 | Dreher | |
| 7,409,885 B2 | 8/2008 | Krauss et al. | |
| 7,416,514 B2 | 8/2008 | Dell et al. | |
| 7,431,006 B2 | 10/2008 | Jankuski | |
| 7,464,618 B2 | 12/2008 | Mohlmann et al. | |
| 7,478,572 B2 | 1/2009 | Maten et al. | |
| 7,487,864 B2 | 2/2009 | Kohlhaas et al. | |
| 7,500,932 B2 | 3/2009 | Katakura et al. | |
| 7,607,366 B2 | 10/2009 | Hori et al. | |
| 7,610,829 B2 | 11/2009 | Shintani et al. | |
| 7,621,839 B2 | 11/2009 | Jackson | |
| 7,621,844 B2 | 11/2009 | Kishi | |
| 7,624,658 B2 | 12/2009 | Fahland et al. | |
| 7,631,740 B2 | 12/2009 | Leibbrandt et al. | |
| 7,635,058 B2 | 12/2009 | Moehlmann et al. | |
| 7,643,925 B2 | 1/2010 | Whitton | |
| 7,689,340 B2 | 3/2010 | Schweizer | |
| 7,735,618 B2 | 6/2010 | Homm et al. | |
| 7,740,558 B2 | 6/2010 | Matsumura et al. | |
| 7,752,936 B2 | 7/2010 | Kobayashi et al. | |
| 7,757,831 B2 | 7/2010 | Stehr et al. | |
| 7,766,139 B2 | 8/2010 | De Maziere et al. | |
| 7,775,338 B2 | 8/2010 | Yoshida et al. | |
| 7,845,247 B2 | 12/2010 | Olds et al. | |
| 7,846,055 B2 * | 12/2010 | Earhart | F16H 3/006 475/207 |
| 7,891,263 B2 | 2/2011 | Mowbray et al. | |
| 7,896,770 B2 * | 3/2011 | Earhart | F16H 37/0833 475/209 |
| 7,962,267 B2 | 6/2011 | Honma et al. | |
| 7,971,697 B2 | 7/2011 | Kemmner et al. | |
| 8,453,531 B2 * | 6/2013 | Gumpoltsberger | F16H 3/006 74/330 |
| 2004/0007055 A1 | 1/2004 | Kralik et al. | |
| 2005/0067251 A1 | 3/2005 | Braford, Jr. et al. | |
| 2005/0101432 A1 | 5/2005 | Pels et al. | |
| 2005/0204837 A1 | 9/2005 | Janson et al. | |
| 2006/0207365 A1 | 9/2006 | Baldwin | |
| 2007/0142171 A1 | 6/2007 | Jiang | |
| 2007/0220999 A1 * | 9/2007 | Hatori | F16H 3/006 74/330 |
| 2007/0266810 A1 | 11/2007 | Forsyth et al. | |
| 2007/0277635 A1 | 12/2007 | Komori | |
| 2008/0000311 A1 | 1/2008 | Baldwin | |
| 2008/0223683 A1 | 9/2008 | Grethel | |
| 2009/0000897 A1 | 1/2009 | Staudinger et al. | |
| 2009/0069992 A1 | 3/2009 | Preisner et al. | |
| 2009/0125201 A1 | 5/2009 | Leibbrandt et al. | |
| 2009/0131218 A1 | 5/2009 | Nedachi et al. | |
| 2009/0145253 A1 | 6/2009 | Katakura et al. | |
| 2009/0165582 A1 | 7/2009 | Tsunashima et al. | |
| 2009/0165584 A1 | 7/2009 | Ishii | |
| 2009/0166147 A1 | 7/2009 | Neri et al. | |
| 2009/0209383 A1 | 8/2009 | Olson et al. | |
| 2009/0264254 A1 | 10/2009 | Jaeggle et al. | |
| 2009/0321209 A1 | 12/2009 | Grethel et al. | |
| 2010/0042302 A1 | 2/2010 | Fritzer et al. | |
| 2010/0099537 A1 | 4/2010 | Maten et al. | |
| 2010/0206107 A1 | 8/2010 | Gumpoltsberger et al. | |
| 2010/0206108 A1 | 8/2010 | Gumpoltsberger et al. | |
| 2010/0218628 A1 | 9/2010 | Gumpolsberger et al. | |
| 2010/0218629 A1 * | 9/2010 | Gumpoltsberger | F16H 3/006 74/331 |
| 2010/0251844 A1 | 10/2010 | Ross et al. | |
| 2010/0257964 A1 * | 10/2010 | Rieger | F16H 3/006 74/331 |
| 2010/0261577 A1 | 10/2010 | MacFarlane et al. | |
| 2010/0268427 A1 | 10/2010 | Kabrich | |
| 2011/0015035 A1 | 1/2011 | Marcigliano et al. | |
| 2011/0017015 A1 | 1/2011 | Cimatti et al. | |
| 2011/0042177 A1 | 2/2011 | Bauer et al. | |
| 2011/0054752 A1 | 3/2011 | Arai | |
| 2011/0056315 A1 | 3/2011 | Lundberg et al. | |
| 2011/0056317 A1 | 3/2011 | Sato | |
| 2011/0094845 A1 | 4/2011 | Hogberg et al. | |
| 2011/0114437 A1 | 5/2011 | Noehl | |
| 2011/0146444 A1 | 6/2011 | Mohlin et al. | |
| 2011/0146445 A1 | 6/2011 | Silva et al. | |
| 2011/0167957 A1 | 7/2011 | Kato et al. | |
| 2011/0180352 A1 | 7/2011 | Kirchner et al. | |
| 2011/0190990 A1 | 8/2011 | Nedachi et al. | |
| 2012/0004063 A1 | 1/2012 | Koyama et al. | |
| 2012/0240723 A1 * | 9/2012 | Gluckler | B60K 6/36 74/661 |

* cited by examiner

DUAL CLUTCH TYPE POWER TRANSMISSION WITH ALTERNATIVE TORQUE TRANSMISSION PATH PROVIDING ALTERNATIVE RATIOS

CROSS REFERENCE TO RELATED APPLICATIONS

This application claims priority from U.S. Application No. 61/614,999 filed 23 Mar. 2012. For purposes of the United States, this application claims the benefit under 35 U.S.C. §119 of U.S. Application No. 61/614,999 filed 23 Mar. 2012 and entitled DUAL CLUTCH TYPE POWER TRANSMISSION WITH ALTERNATIVE TORQUE TRANSMISSION PATH PROVIDING ALTERNATIVE RATIOS which is hereby incorporated herein by reference for all purposes.

TECHNICAL FIELD

This invention relates to power transmissions. The invention relates specifically to dual clutch type power transmissions.

BACKGROUND

A dual clutch power transmission provides two alternative pathways for the transmission of torque from an input to an output. Dual clutches, one in each of the pathways, control which pathway is in use at any given time. Dual clutch transmissions can be advantageous in that shifting between gears can occur relatively quickly and also torque may be delivered continuously through a gear shift.

FIG. 1 illustrates schematically a dual clutch transmission 10. Transmission 10 has an input shaft 12 that may be connected to be driven by an engine or other driver. Torque from input shaft 12 is transferred to a first section 16 of transmission 10 by way of a first clutch 14 ("C1"). Torque from input shaft 12 can also be transferred to a second section 17 of transmission 10 by way of a second clutch 15 ("C2"). Sections 16 and 17 each drive an output shaft 18. Section 16 provides odd gear ratios while section 17 provides even gear ratios. In operation, transmission 10 may be operated by first engaging clutch 14 while first section 16 of the transmission is in a first (low) gear. When it is desired to shift transmission 10 to a higher gear, then second section 17 may be preselected to be in a second gear while clutch 15 is open (i.e. not transmitting torque to the second section 17). When it is desired to implement the gear shift, clutch 14 may be opened and clutch 15 may be closed thereby reaching a situation in which power is transmitted to output 18 by way of second clutch 15 and second section 17 of transmission 10. A further shift may be implemented by placing first section 16 in a next higher gear (for example, third gear) and then shifting by closing clutch 14 while opening clutch 15. Downshifts may be implemented by reversing this process.

A suitable electronic or mechanical control system (not shown) is provided to implement gear shifts.

A wide range of dual clutch transmissions have been described in the literature. Those of skill in the art understand that the physical components of such transmissions may be arranged in a wide variety of ways.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An example aspect of the invention is a transmission having an input, an output, transmission sections, clutches and a torque transfer mechanism. The input and the output are connected via the transmission sections. The transmission sections may comprise a first section providing a first plurality of gear ratios, and a second section providing one or more second gear ratios, between the input and the output. The clutches are configured to selectively couple the input to the transmission sections (a first clutch to couple the input to a first transmission section, and a second clutch to couple the input to a second transmission section). The torque transfer mechanism is selectively operable to transfer torque from the first transmission section to the second transmission section to provide an alternative torque transmission path from the input to the output.

The alternative torque transmission path includes at least one of the stages of gearing of the first transmission section and at least one of the stages of gearing of the second transmission section. The alternative torque transmission path also provides one or more gear ratios between the input and the output that is different from the first plurality of gear ratios and the one or more second gear ratios.

In another aspect of the invention the transmission provides for gear reduction stages in the first transmission section. Also, the alternative transmission path may comprise at least one stage of gear reduction provided by one of the one or more stages of gearing of the first transmission section and at least one stage of gear reduction provided by one of the one or more stages of gearing of the second transmission section. The alternative transmission path may include reduction gearing in a portion of the alternative transmission path connecting components of the first and second transmission sections.

In yet another aspect of the invention the torque transfer mechanism comprises a gear train configured to transfer torque between a first shaft of the first transmission section and a second shaft of the second transmission section. This gear train may comprise a jack-shaft carrying a gear in mesh with a first gear on the first shaft and a second gear on the second shaft.

Another aspect of the invention comprises a method for configuring a transmission to provide an alternative gear ratio. The transmission may comprise an input, an output, a first transmission section providing one or more stages of gear reduction and configurable to provide one of a first plurality of gear ratios between the input and the output, and a second transmission section providing one or more stages of gear reduction configurable to provide one of a second plurality of gear ratios between the input and the output. The transmission may have a first clutch operable to selectively couple the input to the first transmission section and a second clutch operable to selectively couple the input to the second transmission section. The method comprises configuring a torque transfer mechanism to transfer torque from the first transmission section to the second transmission section to provide an alternative torque transmission path from the input to the output that includes at least one of the one or more stages of gear reduction of the first transmission section and at least one of the one or more stages of gear reduction of the second transmission section and provides one or more gear ratios between the input and the output that is different from the gear ratios of the first and second pluralities of gear ratios.

Further aspects and example embodiments are illustrated in the accompanying drawings and/or described in the following description.

BRIEF DESCRIPTION OF DRAWINGS

The accompanying drawings depict non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
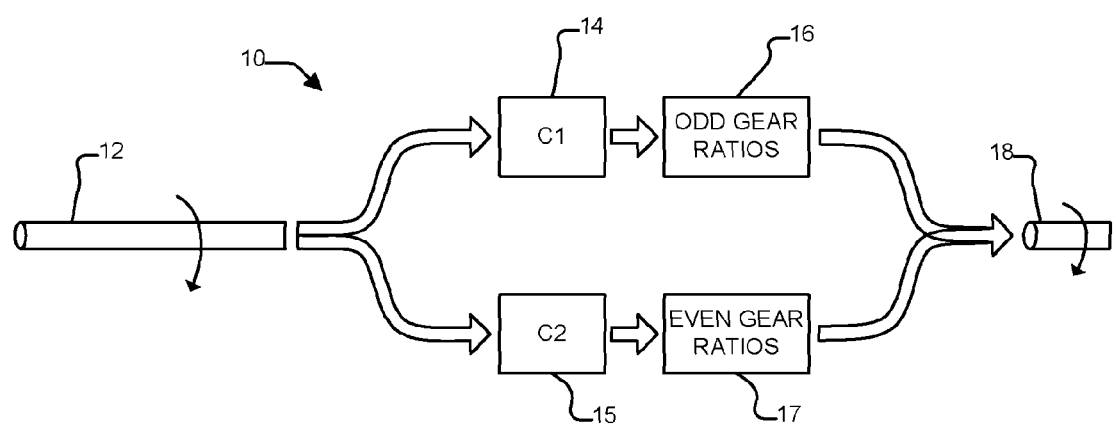
FIG. 1 is a schematic view of a dual clutch type transmission.
Figure 2:
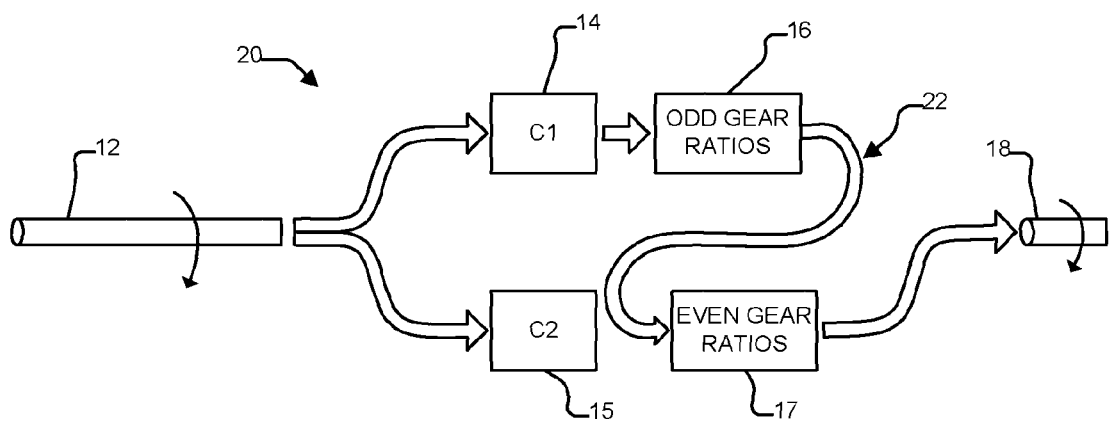
FIG. 2 is a schematic view of a dual clutch type transmission according to an embodiment of the invention configured to provide an alternative gear ratio.

FIG. 1 illustrates schematically a typical dual clutch transmission according to the prior art. In the figures, including in FIG. 2, components in common with the transmission 10 of FIG. 1 are given the same reference numerals. As shown in FIG. 2, transmission 20 provides the option of establishing a different gear ratio (for example, an ultra low gear ratio) by configuring the transmission to provide an alternative torque transmission path 22. In the illustrated embodiment, path 22 transfers torque from an output of first transmission section 16 to an input of second transmission section 17. When in this configuration, transmission 20 has a gear ratio which is the product of the gear ratios for which first and second sections 16 and 17 are configured. If first and second sections 16 and 17 are configured for speed reduction, then the overall gear ratio of transmission 20 when in the illustrated mode may be a gear ratio that is lower than either first section 16 or second section 17 can be configured to provide on its own.

It is not mandatory for path 22 to pass completely through first transmission section 16 or second transmission section 17. In some embodiments one or both of first transmission section 16 and second transmission section 17 provide more than one stage of gearing (for example, more than one gear reduction stages). In such embodiments, path 22 may be configured to include at least one gearing stage of first transmission section 16 and at least one gearing stage of second transmission section 17. In some embodiments path 22 includes a torque coupling between the first and second transmission sections 16, 17 that provides additional gearing. In such embodiments a final gear ratio provided by alternative path 22 is a product of a gear ratio provided by the portion of first transmission section 16 that path 22 traverses, the gear ratio provided by the coupling between the first and second transmission sections 16, 17 and the gear ratio provided by the portion of second transmission section 17 traversed by path 22.

FIG. 2 illustrates alternative power transmission path 22 flowing from first transmission section 16 having odd gear ratios (e.g. ratios for first, third, fifth gear etc.) to second transmission section 17 having even gear ratios (e.g. ratios for second, fourth, sixth gear etc.), however first transmission section 16 may have even gear ratios while second transmission section 17 has odd gear ratios.

When not configured in the manner illustrated in FIG. 2, transmission 20 may be operated in the same manner as the dual clutch transmission 10 illustrated in FIG. 1, in that power may be transmitted from input shaft 12 through first clutch 14 to first transmission section 16 and then to output shaft 18 (or from input shaft 12 through second clutch 15 to second transmission section 17 and then to output shaft 18).

Alternative transmission path 22 may be implemented in a wide variety of ways depending upon the details of construction of transmission 20.

In some embodiments the coupling between the first and second transmission sections 16, 17 (which may be termed a 'transfer path') comprises one or more of: a gear train, a belt drive, a chain drive, a fluid drive, or the like. For example, a fluid drive may be provided in which a component of first transmission section 16 drives a fluid pump, a fluid motor is coupled to drive a component of second transmission section 17 and the fluid motor is driven by fluid pumped by the fluid pump.

In some embodiments the transfer path provides a gear ratio other than 1:1. For example, where it is desired for alternative path 22 to provide an extra low gear then the transfer path may provide a step down in gearing. Where it is desired for alternative path 22 to provide an extra high gear then the transfer path may provide a step up in gearing.

Figure 3A:
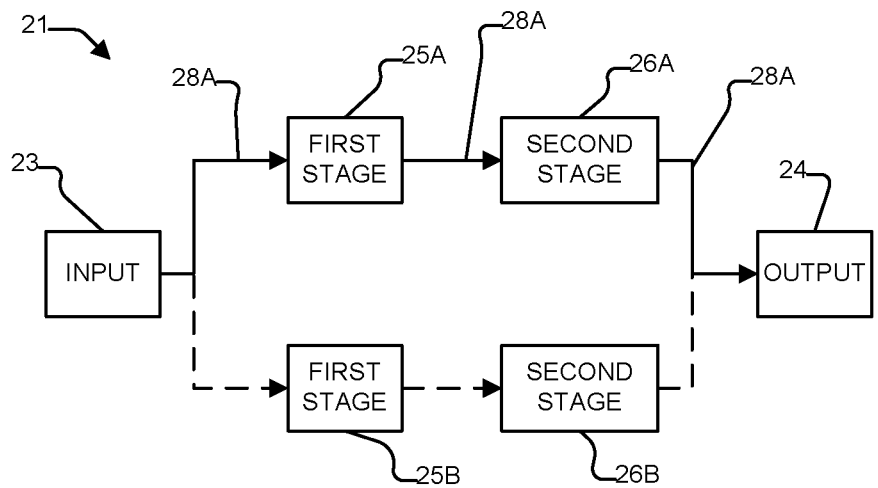
FIG. 3A is a schematic view of a dual clutch type transmission according to an embodiment of the invention configured to provide a first torque transmission path.

FIGS. 3A, B, and C show schematically an example dual clutch transmission 21 according to an example embodiment of the invention in three different operational states. Transmission 21 transmits torque from an input 23 to an output 24. Transmission 21 has two transmission sections which each provide first and second stages of gearing. The first section comprises first stage 25A and second stage 26A. The second section comprises first stage 25B and second stage 26B. Either section can be operated to transmit torque from input 23 to output 24. Each stage may provide an increase or a decrease in rotational speed. The first and second sections may collectively provide a series of increasing gear ratios such that the transmission can be shifted up through a series of stepwise increasing gear ratios or shifted down through a series of stepwise decreasing gear ratios by alternating between passing torque through the first section and passing torque through the second section.

Figure 3B:
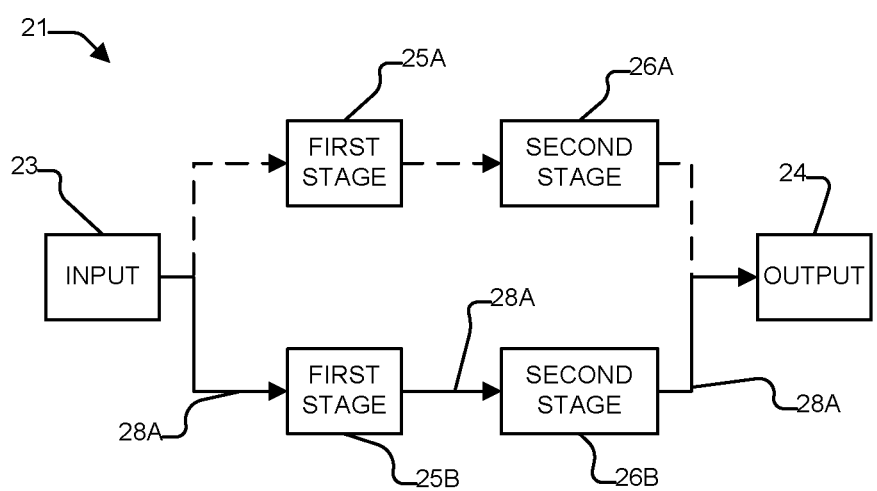
FIG. 3B is a schematic view of a dual clutch type transmission according to an embodiment of the invention configured to provide a second torque transmission path.
Figure 3C:
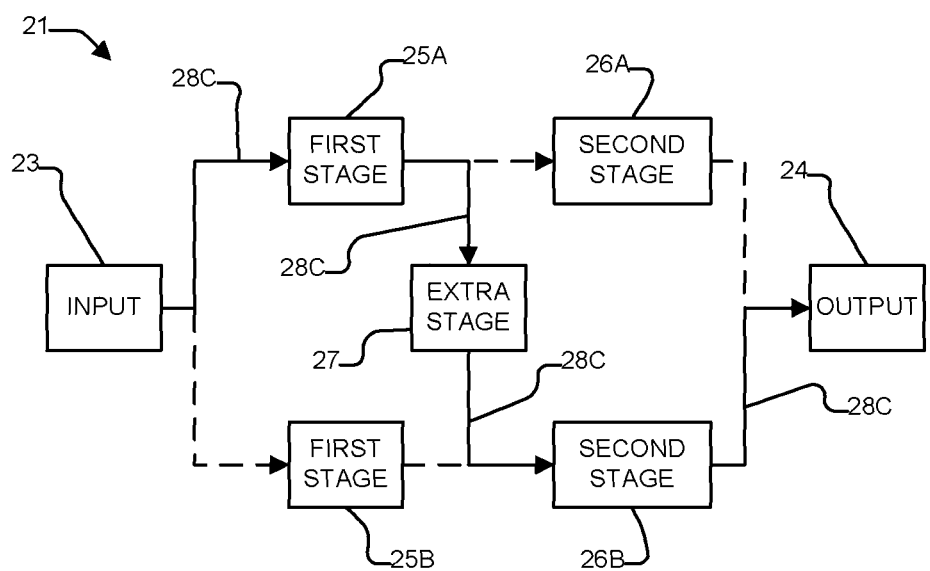
FIG. 3C is a schematic view of a dual clutch type transmission according to an embodiment of the invention configured to provide an alternate torque transmission path.

Transmission 21 has an extra stage 27 that can be coupled between the first and second stages such that torque is transmitted from a first stage 25A or 25B of one section to the second stage 26A or 26B of the other section (see FIG. 3C). In some embodiments first stage 25A, 25B, second stage 26A, 26B and/or extra stage 27 may alter the direction of rotation, alter the axis of rotation or the like. First stage 25A, 25B, second stage 26A, 26B and extra stage 27 may each comprise one or more of a gear connection, a belt connection, a torque converter, or the like. In an example embodiment, each of first stages 25A and 25B and each of second stages 26A and 26B comprises a pair of gears. In a preferred embodiment the gears of each pair are in constant mesh. In some example embodiments, extra stage 27 also comprises meshing gears. In some such embodiments the gears of extra stage 27 may be out of mesh when extra stage 27 is not being used to transmit torque.

FIG. 3A shows transmission 21 in a first operational state with torque being transmitted through a first power path 28A. Power path 28A flows from input 23 through first stage 25A and second stage 26A to output 24.

FIG. 3B shows transmission 21 in a second operational state with torque being transmitted through a second power path 28B. Power path 28B flows from input 23 through first stage 25B and second stage 26B to output 24.

FIG. 3C shows transmission 21 in a third operational state with torque being transmitted through a third power path 28C. Power path 28C flows from input 23 through first stage 25A, to extra stage 27, then through second stage 26B to output 24. Extra stage 27 may allow for an additional reduction or increase in rotational speed greater than, or different from, what would be available with first stages 25A, 25B and second stages 26A, 26B alone.

The particular power path shown in FIG. 3C is not the only possible power path for transmission 21 and transmission 21 may accommodate other power paths. In a non-limiting example, transmission 21 could have a power path flowing from input 23 through first stage 25A to extra stage 27, then through first stage 25B to second stage 26B and output 24.

The various power paths of transmission 21 may be engaged and disengaged in a number of ways known in the art. For example, first stages 25A, 25B, second stages 26A, 26B and extra stage 27 may be engaged or disengaged by way of synchronizers, dog clutches, friction clutches, multi-plate clutches or the like.

FIG. 4 shows, again schematically, an example transmission 30 according to an example embodiment of the invention. Transmission 30 transmits torque from an input shaft 12 to an output shaft 18. Transmission 30 has dual clutches 31A and 31B. The output of clutch 31A drives shaft 32A. The output of clutch 31B drives shaft 32B. Shaft 32A carries gears 33A and 34A which engage with gears 35A and 36A carried on a parallel shaft 37A. A synchronizer 38A can selectively couple one of gears 35A and 36A to shaft 37A while the other one of gears 35A and 36A is freewheeling. Also mounted on shaft 37A are gears 39A and 40A. A synchronizer 41A may be slidably mounted on shaft 37A to selectively couple one of gears 39A and 40A to rotate with shaft 37A while the other one of gears 39A and 40A is freewheeling. Gears 39A and 40A are, respectively, coupled with gears 43 and 44 on output shaft 18.

It can be appreciated that torque from input shaft 12 can be coupled to output shaft 18 by way of shaft 37A when clutch 31A is engaged. The torque is transferred by way of one of the pairs of gears 33A and 35A or 34A and 36A (depending upon the position of synchronizer 38A) to shaft 37A. The torque is then delivered to output shaft 18 by one of the pairs of gears 39A and 43 or 40A and 44 (depending upon the position of synchronizer 41A). The gear ratio provided by this first power transmission path is determined by the ratio of the diameters of the pairs of gears through which the torque is transmitted. The ratios provided by the pairs of gears may be selected such that this first power transmission path provides one of four available gear ratios.

A second alternative power transmission path is provided by way of second clutch 31B and gears mounted on a second parallel shaft 37B. This second power transmission path can provide an additional four gear ratios between input shaft 12 and output shaft 18. In some embodiments, the ratios provided by the second path are intermediate to ratios provided by the first path such that, by alternating selecting a gear ratio on the first path with selecting a gear ratio provided by the second path, one can shift transmission 30 up or shift down through eight progressive gear ratios.

Transmission 30 is configured to provide an alternative power transmission path by way of a third clutch 50. In the illustrated embodiment, third clutch 50 permits torque to be transmitted from parallel shaft 37B over to parallel shaft 37A. This torque transfer mechanism permits at least some components of the gear train used for the first power transmission path, described above, to be used together with at least some components of the second power transmission path to yield an alternative power transmission path. The alternative power transmission path may optionally but advantageously provide gearing outside of a range provided by the gearing of the first and second torque transmission paths discussed above.

Figure 4:
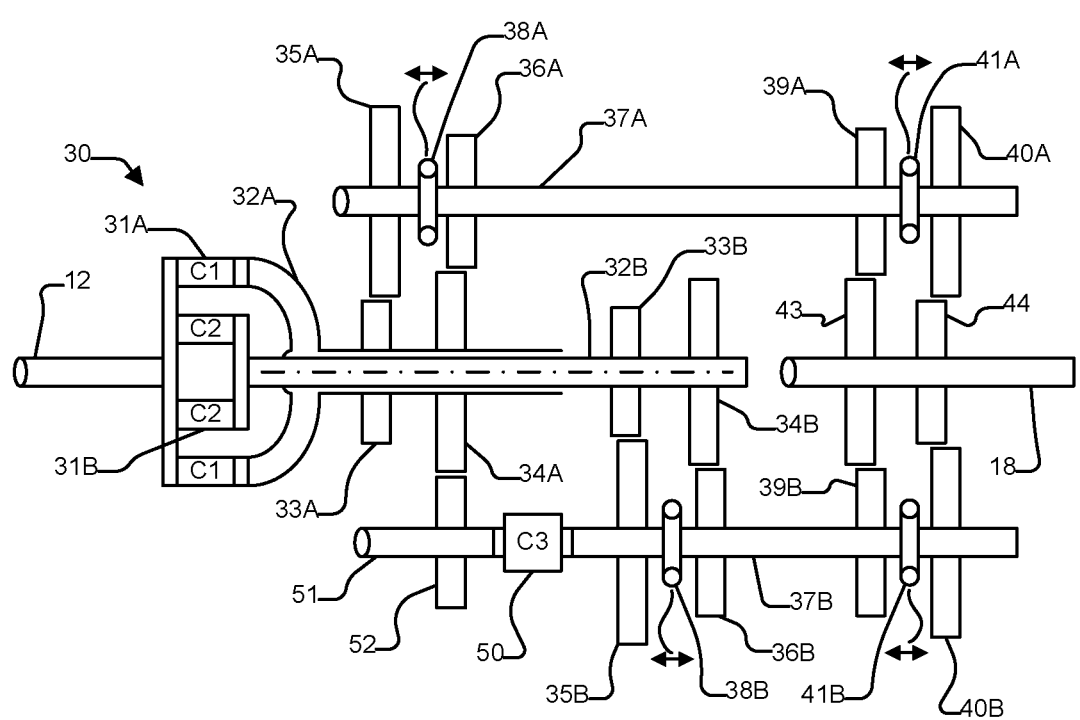
FIG. 4 is a schematic view of a dual clutch type transmission according to another example embodiment of the invention.

To configure transmission 30 as illustrated in FIG. 4 to operate in the alternative torque delivery mode, first clutch 31A is disengaged, second clutch 31B is engaged, and third clutch 50 is also engaged. In the illustrated embodiment, engaging third clutch 50 couples shaft 37B to drive shaft 51 which carries gear 52. Gear 52 can drive shaft 37A by way of gears 34 and 36A or by way of gear 34, gear 33A, and gear 35A (depending upon the position of synchronizer 38A). When this is done, torque at input shaft 12 is transmitted through second clutch 31B to shaft 32B. The torque is transmitted to shaft 37B by way of one of gear pairs 33B/35B or 34B/36B (depending upon the position of synchronizer 38B). The direct torque coupling between shaft 37B and output shaft 18 is disengaged. This may be achieved, for example by positioning synchronizer 41B such that both of gears 39B and 40B are freewheeling.

Torque is transmitted by way of gears 52 and 34A to shaft 32A and from there to shaft 37A by way of one of gear pairs 33A/35A or 34A/36A (depending upon the position of synchronizer 38A). Torque is then transmitted to output shaft 18 by one of gear pairs 39A/43 or 40A/44 (depending upon the position of synchronizer 41A). Thus, it can be seen that the overall gear ratio provided by this alternative configuration provides at least one extra gear ratio. The alternative configuration may include an extra stage of reduction. This may be used, for example, to provide an ultra low gear.

Figure 5:
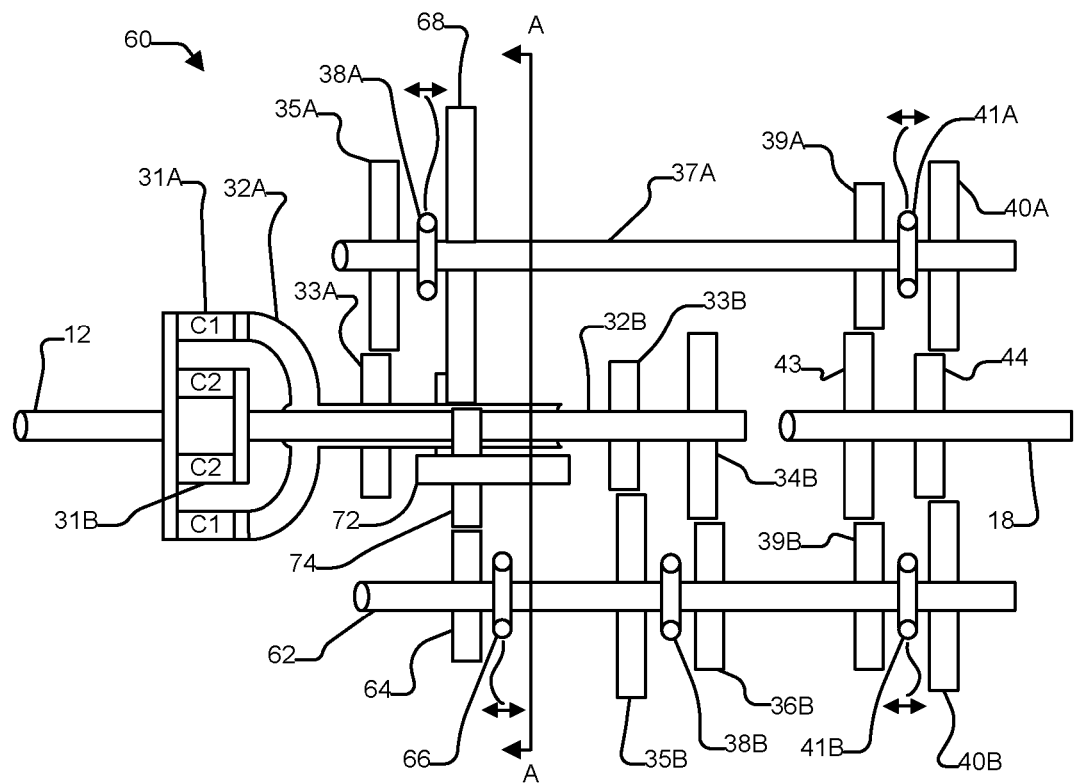
FIG. 5 is a schematic view of a dual clutch type transmission according to another embodiment of the invention.

FIG. 5 shows schematically an example of a dual clutch transmission 60 according to another embodiment of the invention. Transmission 60 differs from transmission 30 of FIG. 4 in various ways including that the drive shaft 51, clutch 50 and second parallel shaft 37B of the FIG. 4 embodiment have been modified to provide an integrated drive shaft 62. Drive shaft 62 carries gears 35B, 36B, 39B, and 40B and in at least this respect is generally similar to second parallel drive shaft 37B. Drive shaft 62 carries gear 64, which may be selectively coupled to drive shaft 62 by synchronizer 66 to either transmit torque or to freewheel, depending on the position of synchronizer 66. Gear 64 may drive jackshaft 72 by way of gear 74. Jackshaft 72 and gear 74 may then drive first parallel shaft 37A by way of gear 68 (which has replaced gear 36A of the FIG. 4 embodiment) and thus provide a torque transfer mechanism. Torque is then transmitted to output shaft 18 by one of gear pairs 39A/43 or 40A/44 (depending upon the position of synchronizer 41A).

Gear 64 may selectively coupled to transmit torque to gear 74 from shaft 62 by way of a dog clutch, synchronizer, multi-plate clutch, motion to engage/disengage from gear 74, or any other suitable arrangement.

In the illustrated configuration, torque is transmitted from input shaft 12 through clutch 31B to shaft 32B. Clutch 31A is open. Shaft 32B transmits torque to shaft 62 by way of gears 33B/35B or in some cases gears 34B/36B depending on which of gears 35B and 36B is engaged to rotate with shaft 62 by synchronizer 38B. In general, both gears 39B and 40B are allowed to freewheel by synchronizer 41B. As described above, torque is then transmitted through gear 64 to gear 74 and jackshaft 72, which in turn transmits torque to gear 68 and first parallel shaft 37A. Gear 68 is coupled to first parallel shaft 37A by synchronizer 38A, while gear 35A is allowed to freewheel. Torque may then be transmitted to output shaft 18 by way of gears 39A/43 or gears 40A/44 depending on which of gears 39A, 40A are coupled to first parallel shaft 37A by synchronizer 41A.

As a result, drive shaft 62, jackshaft 72 and first parallel shaft 37A may be connected in series to provide an additional gear ratio. This additional gear ratio may provide for an additional reduction in the overall gear ratio provided by the illustrated alternative configuration. The alternative ratio may, for example, provide an ultra low gear.

In some embodiments, jackshaft 72 may carry an additional gear (not shown) that meshes with one of gears 68 or 64. In such embodiments gear 74 may only mesh with one of gears 68 or 64, rather than both as shown in FIG. 5. This configuration may provide for a further gear reduction in addition to that of the embodiment shown in FIG. 5.

Figure 5A:
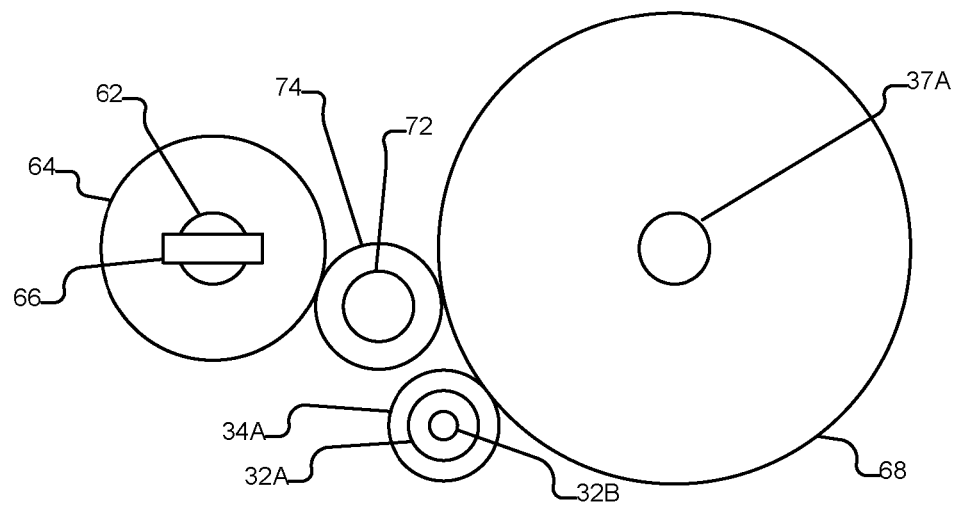
FIG. 5A is a schematic cross section view along lines A-A of FIG. 5 of a dual clutch type transmission according to another embodiment of the invention.

FIG. 5A is a cross section view along lines A-A of FIG. 5. FIG. 5A shows an example configuration of shafts 32A, 32B, 62, 72 and 37A. In the illustrated embodiments, shafts 37A, 32A and 62 are arranged in a vee configuration. This facilitates an alternative torque transmission path which couples shafts 37A and 62.

The longitudinal axes of shafts 37A and 62 are shown to be generally horizontally aligned. Shafts 32B and 32A are shown positioned generally below shafts 37A and 62 and generally equally horizontally spaced between them. Shaft 72 is also shown located generally below shafts 37A and 62 and positioned horizontally generally between them. In other embodiments shaft 72 may be located generally above shafts 37A and 62. As shown in FIG. 5A, shaft 32A may be connected to gear 68 through gear 34A. Shaft 72 may also be connected to gear 68 through gear 74. In one embodiment, when gear 68 is driven via gear 34A, gear 64 is allowed to freewheel by synchronizer 66, so, consequently, gear 74 and shaft 72 may also rotate without transmitting torque. Conversely, when gear 68 is driven via gear 74, shaft 32A and gear 34A are allowed to freewheel due to clutch 31A being open.

The transmission 60 illustrated in FIG. 5 is shown having synchronizer 66. This is not necessary; other mechanisms for engaging and disengaging gear 64 are available. For example, shaft 62 may have a clutch or other mechanism known in the art to selectively allow gear 64 to freewheel relative to shaft 62. Further, shaft 62 is shown as a single shaft. This is not necessary. Shaft 62 may be comprised of two or more parts. For example, the portion of shaft 62 carrying gear 64 may be separate from the portion carrying gears 35B and 36B. In such embodiments, the portion of shaft 62 carrying gear 64 may be engaged and disengaged from other portions of shaft 62 by means of a synchronizer, clutch or the like. In still other embodiments, gear 74 may freewheel relative to jackshaft 72 by way of bearings, rollers or the like. In other embodiments, gear 74 may be allowed to selectively freewheel relative to shaft 72 by way of a synchronizer, clutch or the like.

Figure 6:
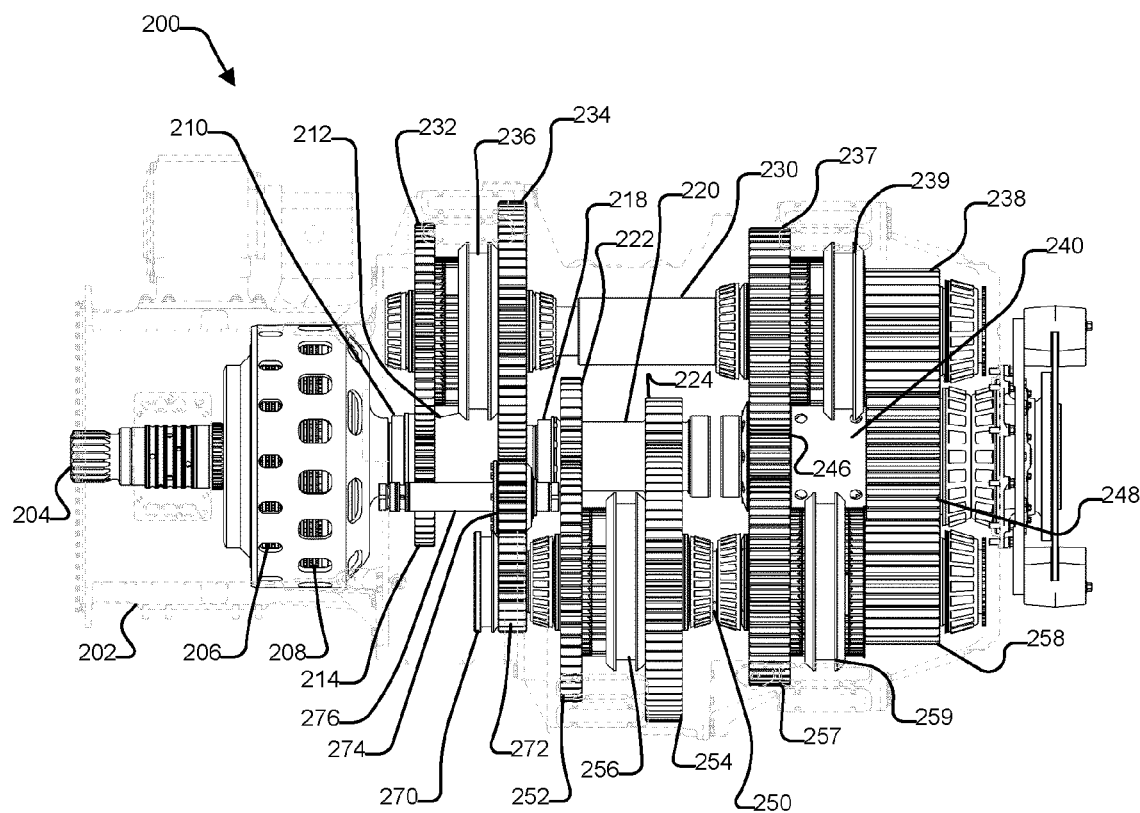
FIG. 6 is a front view of a dual clutch type transmission according to an embodiment of the invention.

FIG. 6 shows a top view of the interior of dual clutch transmission 200. Dual clutch transmission 200 has a case 202 supporting the transmission components. Input shaft 204 provides an input for rotational energy or torque. Input shaft 204 is connected to a first clutch 206 and a second clutch 208. Each clutch may selectively engage or disengage input shaft 204 from components downstream from the clutch.

First clutch 206 couples input shaft 204 to first shaft 210. First shaft 210 has a gear section 212 having a central axis generally aligned with the central axis of input shaft 204. In the illustrated embodiment, first shaft 210 comprises two gears (214, second gear not shown) located at gear section 212. The gear not shown may be located directly beneath gear 234. These gears (214, second gear not shown) may be integrally formed with first shaft 210 or may be separate components. First shaft 201 may be supported for rotation by bearings (not shown) for example.

Second shaft 218 is coupled to input shaft 204 by way of second clutch 208. Second shaft 218 has a gear section 220 having a central axis generally aligned with both the central axis of input shaft 204 and the central axis of gear section 212 of first shaft 210. Second shaft 218 comprises gears 222, 224 generally located at gear section 220. Second shaft 218 is supported for rotation in case 202.

First shaft 210 may be selectively coupled to first parallel shaft 230. In particular, gear 214 may be coupled to gear 232 and gear 234 may be coupled to a corresponding gear on first shaft 210 (not shown). Gears 232 and 234 are mounted on first parallel shaft 230. Gear sets 214/232, and 234 and corresponding gear (not shown) may provide different gear ratios. Gear sets 214/232 and/or 234 and corresponding gear (not shown) may be in constant mesh.

First parallel shaft 230 may have a synchronizer 236 for selectively engaging and disengaging gears 232, 234. Synchronizer 236 may be positioned by a suitable actuator such as, for example, mechanically, electrically or hydraulically actuated shifting forks (not explicitly shown). An electronic controller (not shown) may optionally be provided to control the shifting fork to move synchronizer 236 to lock one or gears 232, 234 to shaft 230 or to be in a neutral position. When either one of gears 232, 234 is engaged torque may be transferred from the first shaft 210 to the first parallel shaft 230. When either of gears 232, 234 is disengaged, the gear may freewheel on first parallel shaft 230.

First parallel shaft 230 supports output gears 237, 238 and synchronizer 239. Output gears 237, 238 may transfer torque to output shaft 240 by way of gears 246, 248 respectively. Gears 237, 238 may have substantially the same configuration as gears 232, 234. Gear pairs 237/246 and 238/248 may be selected to provide different gear ratios. Synchronizer 239 may be operated in substantially the same manner as described above for synchronizer 236.

Second shaft 218 may be selectively coupled to second parallel shaft 250. In the illustrated embodiment, gears 222, 224 mesh with gears 252, 254 of second parallel shaft 250. Gears 252, 254 may be selectively engaged or disengaged from second parallel shaft 250 by way of synchronizer 256. Synchronizer 256 may be operated in substantially the same manner as described above for synchronizer 236.

Second parallel shaft 250 supports output gears 257, 258 and synchronizer 258. As described above for first parallel shaft 230, output gears 257, 258 may transfer torque to output shaft 240 from second parallel shaft 250 by way of gears 246, 248 respectively. Gears 257, 258 may have substantially the same configuration as gears 252, 254. Gear pairs 257/246 and 258/248 provide different gear ratios from one another. Synchronizer 259 may be operated in substantially the same manner as described above for synchronizer 236 and may have a neutral position in which both of gears 257, 258 are allowed to freewheel on second parallel shaft 250.

During operation, one of clutch 206 and clutch 208 may be engaged to transfer torque from input shaft 204 to the corresponding one of first shaft 210 and second shaft 218. When clutch 206 is engaged, first shaft 210 may turn the first shaft gears (214, not shown). In a first gear, synchronizer 236 may be configured to engage gear 232 and allow gear 234 to freewheel. Torque is transferred through gears 214 and 232 to first parallel shaft 230. In the same first gear, synchronizer 239 may be configured to engage gear 237 and allow gear 238 to freewheel. Torque is transferred from first parallel shaft 230 to output shaft 240 through gear 237 and output gear 246.

In a second gear, clutch 208 is engaged and clutch 206 is disengaged. Second shaft 218 may then turn gears 222, 224. In the second gear, synchronizer 256 may be configured to engage gear 252 and allow gear 254 to freewheel. Torque is transferred through gears 222 and gear 252 to second parallel shaft 250. In the second gear, synchronizer 259 may be configured to engage gear 257 and allow gear 258 to freewheel. Torque is transferred from second parallel shaft 250 through gear 257 through output gear 246 to output shaft 240.

Similarly, each of gears 214, 222, 224, 232, 234, 237, 238, 252, 254, 257, 258 and the gear not shown may be engaged in various combinations to provide different available gear ratios between input shaft 204 and output shaft 240. In some embodiments, transmission 200 provides a range of 8 different gear ratios.

Transmission 200 includes a jack shaft that can be coupled to transmit torque between second parallel shaft 250 and first parallel shaft 230 to provide an alternative torque transmission path. FIG. 6 shows shaft cap 270 coupled to second parallel shaft 250. Gear 272 may be located on second parallel shaft 250. Shaft cap 270 may be selectively coupled to gear 272 for torque transmission between second parallel shaft 250 and gear 272 by way of a clutch, synchronizer or the like. Gear 272 may be coupled to gear 274, which is supported on jackshaft 276. Gear 274 may be supported on jackshaft 276 to turn freely by way of bearings, lubrication or the like. In other embodiments, jackshaft 276 may turn with gear 274. Gear 274 is further engaged with gear 234 of first parallel shaft 230. This connection allows second parallel shaft 250 and first parallel shaft 230 to be connected in series to provide one or more additional gear ratios.

Referring to both FIGS. 5 and 6, when first and second parallel shafts 230, 250 are to be connected in series, the transmission 200 may be configured as follows. Second clutch 208 is engaged and first clutch 206 is disengaged. Torque can then flow from input shaft 204 through second clutch 208 to second shaft 218. Synchronizer 256 is positioned to engage one of gears 252 or 254, for example gear 254. Torque is transmitted through gear 224 and gear 254 to second parallel shaft 250. Synchronizer 259 is positioned to disengage both output gears 257 and 258, allowing both to freewheel.

Referring now to FIG. 6, shaft cap 270 engages gear 272 such that second parallel shaft 250, shaft cap 270 and gear 272 may transfer torque to gear 274. Gear 274 is free to rotate about jackshaft 276. Synchronizer 236 is positioned to engage gear 234, which receives torque from gear 274. Synchronizer 239 is positioned to engage one of gears 237 or 238, such as gear 238. Gear 238 transmits torque to output gear 248 and output shaft 240. As a result, torque is transmitted from input shaft 204 to output shaft 240 through both first parallel shaft 230 and second parallel shaft 250 in series. In the illustrated embodiment, this provides an additional and lower gear ratio than is available through the gearing provided on either the first or second parallel shaft 230, 250 alone.

Transmission 200 has gears in constant mesh with synchronizers provided for engaging/disengaging the gears. Other mechanisms for engaging and disengaging gears may be provided. For example, dog clutches may be used. In some embodiments gearing used to provide an alternative torque transmission path is not in constant mesh. In such embodiments the alternative torque transmission path may be enabled by moving a gear from an out-of-mesh position to an in-mesh position in which the gear provides at least part of a torque transmission path between first and second transmission sections.

In some embodiments, the transmission, such as transmission 200, may be locked to prevent rotation of the output (or other shafts) of the transmission in a park mode. Park mode may be engaged by stopping the transmission and engaging two or more transmission power paths having different gear ratios. In park mode, the simultaneous engagement of two different gear ratios causes a transmission shaft to bind which prevents rotation of that shaft.

For example, park mode may be engaged in transmission 30 by engaging a first power path through clutch 31A and a second power path through clutch 31B. In a non-limiting example, the first power path may be formed by engaging clutch 31A, engaging gear set 33A/35A by way of synchronizer 38A and engaging gear set 39A/43 by way of synchronizer 41A. The second power path may be formed by engaging clutch 31B, engaging gear set 34B/36B by way of synchronizer 38B and engaging gear set 39B/43 by way of synchronizer 41B. This results in gear 43 receiving two inputs which would otherwise result in two different rotational rates of gear 43 by way of gears 39A and 39B, locking gear 43 and output shaft 18. Because gear 43 cannot be driven at two rates at once, it becomes locked. In an alternative example, the second power path could be formed by engaging gear set 40B/44 instead of gear set 39B/43. This may result in output shaft 18 receiving two inputs which would otherwise result in two different rotational speeds from gears 43 and 44, locking output shaft 18.

In another example, park mode may be engaged in transmission 200 by engaging a first power path through clutch 206 and a second power path through clutch 208. In one example, the first power path may be formed by engaging clutch 206, and the gear set including gear 234 and the corresponding gear (not shown) on shaft 210 (by engaging gear 234 to first parallel shaft 230 via synchronizer 236). The second power path may be formed by engaging clutch 208, gear set 222/252 (by engaging gear 252 to second parallel shaft 250 via synchronizer 256) and gear set 272/274/234 (by coupling shaft cap 270 to gear 272 such that it rotates with second parallel shaft 250). As a result, gear 234 is engaged with two gears which would transmit torque at two different rotational rates, which locks gear 234 in place and consequently prevents rotation of shafts 210, 220, 230, and 250 in transmission 200.

The control of the synchronizers or other engagement/disengagement mechanisms may be implemented by a transmission control unit such as is known in the art. The transmission control unit may send out signals directing the engagement/disengagement of the synchronizers based on transmission parameters, engine parameters, a pre-programmed pattern, user commands or the like.

Transmissions as described herein have a wide range of applications. Such transmissions may, for example, be applied in stationary high-power applications. One such application is for driving pumps used for hydraulic fracturing of geological formations. Such pumps may have high torque and power requirements. For example, such a pump may be driven by an engine in the range of 2000 or 3000 or more horsepower (1500 kW or 2250 kW or more) delivering torque at 5000 or more lbft (6800 or more Nm). Transmissions in such applications may be required to provide output torque in excess of 10000 lbft (13500 Nm) or 25000 lbft (34000 Nm) or 45000 lbft (61000 Nm) for example.

While transmissions as described herein are not limited to high power applications (e.g. applications involving transfer of power in excess of 1800 horsepower (1350 kW)), such transmissions can be advantageous in such applications. One advantage is that a transmission as described herein may be controlled to provide smooth transfer of torque throughout a gear shift. This, in turn, can reduce damage to pumps or other driven elements resulting from shock as gears are changed suddenly. In a transmission as described herein, one or both clutches may be allowed to slip in a controlled manner to achieve smooth upshifts that do not expose driven components to excessive shock.

It can be convenient for testing and/or other purposes to provide an ultra low gear ratio in transmissions for driving pumps for use in hydraulic fracturing (as well as transmissions for other applications). In some embodiments transmissions as described herein are configured such that the alternative torque transmission path provides an ultra-low gear ratio, for example, a gear ratio lower than approximately 20:1 (e.g. 20:1 or 25:1 or 50:1 etc.). In some embodiments the transmission provides gear ratios in the range of about 10:1 to 1:1 when operating in its standard mode. In some embodiments the gear ratio provided by the alternative path is lower than the lowest gear ratio provided when the transmission is operating in its standard mode by a factor of two or more. For example, if the lowest gear ratio in the standard operating mode of the transmission is 6:1 then the alternative torque transmission path may provide a gear ratio of 12:1 or lower.

INTERPRETATION OF TERMS

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

In addition, where elements such as steps, acts, processes or blocks of a method may presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times or in different sequences.

Where a component (e.g. a gear, bearing, shaft, assembly, clutch, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A transmission comprising:
   an input;
   an output comprising one or more gears;
   a first transmission section providing one or more stages of gearing and configurable to provide one of a first plurality of gear ratios between the input and the output;
   a second transmission section providing one or more stages of gearing configurable to provide one or more second gear ratios between the input and the output;
   a first clutch operable to selectively couple the input to the first transmission section;
   a second clutch operable to selectively couple the input to the second transmission section; and,
   a torque transfer mechanism selectively operable to transfer torque from the first transmission section to the second transmission section to provide an alternative torque transmission path from the input to the output that includes at least one of the one or more stages of gearing of the first transmission section and at least one of the one or more stages of gearing of the second transmission section and provides one or more gear ratios between the input and the output that is different from the first plurality of gear ratios and the one or more second gear ratios;
   wherein:
      the first transmission section comprises a first shaft and a first torque coupling connecting the first shaft to drive the output, the first torque coupling comprising one or more gears carried by the first shaft in constant mesh with the one or more gears of the output wherein the transmission comprises a mechanism for selectively engaging or disengaging the first torque coupling;
      the second transmission section comprises a second shaft and a second torque coupling connecting the second shaft to drive the output, the second torque coupling comprising one or more gears carried by the second shaft in constant mesh with the one or more gears of the output.

2. A transmission according to claim 1 wherein the one or more stages of gearing of the first transmission section comprise one or more stages of gear reduction.

3. A transmission according to claim 2 wherein the alternative transmission path comprises at least one stage of gear reduction provided by one of the one or more stages of gearing of the first transmission section and at least one stage of gear reduction provided by one of the one or more stages of gearing of the second transmission section.

4. A transmission according to claim 1 wherein the alternative transmission path includes reduction gearing in a portion of the alternative transmission path connecting components of the first and second transmission sections.

5. A transmission according to claim 1 wherein:
   the torque transfer mechanism comprises a gear train configured to transfer torque between the first and second shafts.

6. A transmission according to claim 5 wherein the gear train comprises first and second gears on the first and second shafts respectively and a third gear on a jack-shaft parallel to the first and second shafts, the third gear in mesh with each of the first and second gears.

7. A transmission according to claim 6 wherein the second gear is one of the one or more gears of the second shaft that is in constant mesh with an output of the second clutch.

8. A transmission according to claim 6 wherein the first and second shafts and the output are arranged in a vee configuration.

9. A transmission according to claim 5 wherein outputs of the first and second clutches are concentric with one another.

10. A transmission according to claim 9 wherein the output comprises an output shaft concentric with the outputs of the first and second clutches.

11. A transmission according to claim 1 wherein the gear ratios of the first plurality of gear ratios and the at least one second gear ratio, when taken in order of increasing gear ratio, alternate between the first plurality of gear ratios and the at least one second gear ratio.

12. A transmission according to claim 1 wherein the one or more gear ratios of the alternative transmission path are lower than the first plurality of gear ratios and the at least one second gear ratio.

13. A transmission according to claim 1 wherein the alternative transmission path includes a transfer portion connecting the first and second shafts.

14. A transmission according to claim 1 wherein the alternative transmission path comprises a fluid drive comprising a pump driven by a component of the first transmission section and a fluid motor driving a component of the second transmission section.

15. A transmission according to claim 1 wherein the alternative transmission path comprises a belt drive or a chain drive.

16. A transmission according to claim 1 wherein the alternative transmission path comprises a gear train.

17. A method for configuring a transmission to provide an alternative gear ratio wherein the transmission comprises:
   an input;
   an output;
   a first transmission section providing one or more stages of gearing and configurable to provide one of a first plurality of gear ratios between the input and the output;
   a second transmission section providing one or more stages of gearing configurable to provide one of a second plurality of gear ratios between the input and the output;
   a first clutch operable to selectively couple the input to the first transmission section;
   a second clutch operable to selectively couple the input to the second transmission section;
   wherein:
      the first transmission section comprises a first shaft and a first torque coupling connecting the first shaft to drive the output, the first torque coupling comprising one or more gears carried by the first shaft in constant mesh with the one or more gears of the output wherein the transmission comprises a mechanism for selectively engaging or disengaging the first torque coupling;

the second transmission section comprises a second shaft and a second torque coupling connecting the second shaft to drive the output, the second torque coupling comprising one or more gears carried by the second shaft in constant mesh with the one or more gears of the output;

the method comprising disengaging the first torque coupling and configuring a torque transfer mechanism to transfer torque from the first shaft to the second shaft to provide an alternative torque transmission path from the input to the output that includes at least one of the one or more stages of gearing of the first transmission section and at least one of the one or more stages of gearing of the second transmission section and provides one or more gear ratios between the input and the output that is different from the gear ratios of the first and second pluralities of gear ratios.

18. A method according to claim 17 wherein the one or more stages of gearing of the first transmission section comprise one or more stages of gear reduction and one or more stages of gearing of the second transmission section comprise one or more stages of gear reduction.

* * * * *